US008966181B2

(12) United States Patent
Chen et al.

(10) Patent No.: US 8,966,181 B2
(45) Date of Patent: Feb. 24, 2015

(54) MEMORY HIERARCHY WITH NON-VOLATILE FILTER AND VICTIM CACHES

(75) Inventors: Yiran Chen, Eden Prairie, MN (US); Hai Li, Eden Prairie, MN (US); Harry Hongyue Liu, Maple Grove, MN (US); Alan Xuguang Wang, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 873 days.

(21) Appl. No.: 12/332,669

(22) Filed: Dec. 11, 2008

(65) Prior Publication Data

US 2010/0153646 A1 Jun. 17, 2010

(51) Int. Cl.
*G06F 12/00* (2006.01)
*G06F 12/08* (2006.01)

(52) U.S. Cl.
CPC ........ *G06F 12/0897* (2013.01); *G06F 12/0811* (2013.01); *G06F 2212/2024* (2013.01); *G06F 2212/222* (2013.01)
USPC .......................................... 711/122; 711/140

(58) Field of Classification Search
CPC .......................... G06F 12/0811; G06F 12/0855
USPC ................................................ 711/122, 140
See application file for complete search history.

(56) References Cited

U.S. PATENT DOCUMENTS

| | | | | |
|---|---|---|---|---|
| 5,412,612 | A * | 5/1995 | Oyama | 365/228 |
| 6,978,349 | B1 * | 12/2005 | Wilkes | 711/118 |
| 7,082,053 | B1 | 7/2006 | Jenne et al. | |
| 7,103,718 | B2 * | 9/2006 | Nickel et al. | 711/115 |
| 7,336,525 | B2 | 2/2008 | Fujita et al. | |
| 7,434,007 | B2 * | 10/2008 | Evrard et al. | 711/144 |
| 2005/0207223 | A1 | 9/2005 | Taheri et al. | |
| 2006/0179231 | A1 * | 8/2006 | Briggs et al. | 711/136 |
| 2007/0106853 | A1 * | 5/2007 | Evanchik et al. | 711/159 |
| 2008/0007856 | A1 * | 1/2008 | Tango et al. | 360/53 |
| 2008/0016393 | A1 * | 1/2008 | Bose et al. | 714/8 |
| 2008/0109606 | A1 * | 5/2008 | Lataille et al. | 711/133 |
| 2008/0256294 | A1 * | 10/2008 | Gill | 711/117 |
| 2008/0276040 | A1 * | 11/2008 | Moritoki | 711/113 |

(Continued)

OTHER PUBLICATIONS

D. Burger and T. Austin, "The SimpleScalar Tool Set, Version 2.0," University of Wisconsin-Madison Computer Sciences Department Technical Report, Jun. 1997, pp. 1-21, #1342.

(Continued)

*Primary Examiner* — Gurtej Bansal
(74) *Attorney, Agent, or Firm* — Hall Estill Attorneys at Law

(57) ABSTRACT

Various embodiments of the present invention are generally directed to an apparatus and method for non-volatile caching of data in a memory hierarchy of a data storage device. In accordance with some embodiments, a pipeline memory structure is provided to store data for use by a controller. The pipeline has a plurality of hierarchical cache levels each with an associated non-volatile filter cache and a non-volatile victim cache. Data retrieved from each cache level are respectively promoted to the associated non-volatile filter cache. Data replaced in each cache level are respectively demoted to the associated non-volatile victim cache.

19 Claims, 4 Drawing Sheets

(56) References Cited

U.S. PATENT DOCUMENTS

2008/0282032 A1* 11/2008 Shen et al. .................. 711/117
2009/0037664 A1* 2/2009 Kornegay et al. ............ 711/138

OTHER PUBLICATIONS

S. Palacharla, N. Jouppi and J. Smith, "Quantifying the Complexity of Superscalar Processors," in proceeding of 27th International Symposium on Computer Architecture (ISCA), 2000, pp. 1-47.

W. Wang, A. Gibby, Z. Wang, T. Chen, S. Fujita, P. Griffin, Y. Nishi and S. Wong, "Nonvolatile SRAM Cell," in proceeding of International Electron Device Meeting (IEDM), 2006 pp. 1-4, Center for Integrated Systems, Stanford University, CA.

W-F. Wong, C-K Koh, Y. Chen and H. Lai, "VOSCH: Voltage Scaled Cache Hierarchies," International Symposium on Low Power Electronics and Design 2007, submitted to ISLPED 2007, pp. 496-503.

* cited by examiner

MEMORY HIERARCHY WITH NON-VOLATILE FILTER AND VICTIM CACHES

BACKGROUND

Data storage devices generally operate to store and retrieve data in a fast and efficient manner. A top level controller, such as a programmable processor (CPU), can utilize a hierarchical memory structure to manage data during transfers with a main memory of the device, such as a semiconductor array of non-volatile memory cells, magnetic media, etc.

Such hierarchical memory structures can includes cache, which generally comprises one or more relatively small memory blocks of relatively high speed memory operationally proximate the controller. The cache is generally used to maintain processing efficiencies of the controller as high as possible by minimizing the wait times required to access the relatively slower main memory.

Multi-level caching can be used wherein multiple cache levels (e.g., L1, L2, L3) are successively defined along a pipeline memory structure of the device. If requested data is resident in a selected cache level, the data can be quickly retrieved for use by the controller (a cache hit), thereby eliminating the latency required to access the slower main memory to retrieve the requested data.

SUMMARY

Various embodiments of the present invention are generally directed to an apparatus and method for non-volatile caching of data in a memory hierarchy of a data storage device.

In accordance with some embodiments, an apparatus generally comprises a hierarchical cache level in a pipeline memory structure comprising a volatile cache having an associated non-volatile filter cache and a non-volatile victim cache. Data retrieved from the volatile cache are promoted to the non-volatile filter cache, and wherein data replaced in the volatile cache are demoted to the non-volatile victim cache.

In accordance with other embodiments, a method generally comprises providing a pipeline memory structure configured to store data for use by a controller, the pipeline comprising a plurality of hierarchical cache levels each having an associated non-volatile filter cache and a non-volatile victim cache. Retrieved data are promoted from a first selected cache level in the non-volatile filter cache associated with the first selected cache level. Data replaced in a second selected cache level are demoted to the non-volatile victim cache associated with the second selected cache level.

These and various other features and advantages which characterize the various embodiments of the present invention can be understood in view of the following detailed discussion in view of the accompanying drawings.

DETAILED DESCRIPTION

Figure 1:
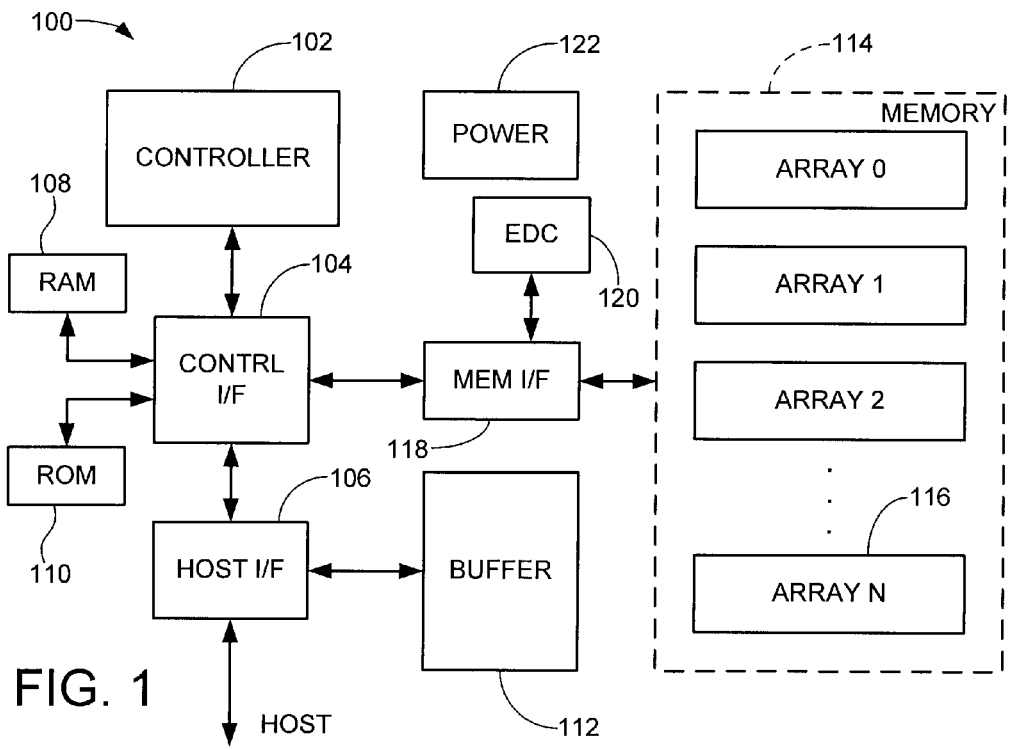
FIG. 1 is a generalized functional representation of an exemplary data storage device constructed and operated in accordance with various embodiments of the present invention.

FIG. 1 provides a functional block representation of a data storage device 100 constructed and operated in accordance with various embodiments of the present invention. The data storage device is contemplated as comprising a portable non-volatile memory storage device such as a PCMCIA card or USB-style external memory device. It will be appreciated, however, that such characterization of the device 100 is merely for purposes of illustration and is not limiting to the claimed subject matter.

Top level control of the device 100 is carried out by a suitable controller 102, which in some embodiments comprises a programmable processor (CPU). The controller 102 communicates with a host device via a controller interface (I/F) circuit 104 and a host I/F circuit 106. Local storage of requisite commands, programming, operational data, etc. is provided via random access memory (RAM) 108 and read-only memory (ROM) 110. A buffer 112 serves to temporarily store input write data from the host device and readback data pending transfer to the host device, as well as to facilitate serialization/deserialization of the data during a transfer operation.

A memory space is shown at 114 to comprise a number of memory arrays 116 (denoted Array 0-N), although it will be appreciated that a single array can be utilized as desired. Each array 116 preferably comprises a block of semiconductor memory of selected storage capacity. Communications between the controller 102 and the memory space 114 are coordinated via a memory (MEM) I/F 118. As desired, on-the-fly error detection and correction (EDC) encoding and decoding operations are carried out during data transfers by way of an EDC block 120.

While not limiting, in an embodiment the various circuits depicted in FIG. 1 are arranged as a single chip or chip set formed on one or more semiconductor dies with suitable encapsulation, housing and interconnection features (not separately shown for purposes of clarity). Input power to operate the device is handled by a suitable power management circuit 122 and is supplied from a suitable source such as from a battery, AC power input, etc. Power can also be supplied to the device 100 directly from the host such as through the use of a USB-style interface, etc.

Any number of data storage and transfer protocols can be utilized, such as logical block addressing (LBAs) whereby data are arranged and stored in fixed-size blocks (such as 512 bytes of user data plus overhead bytes for ECC, sparing, header information, etc). Host commands can be issued in terms of LBAs, and the device 100 can carry out a corresponding LBA-to-PBA (physical block address) conversion to identify and service the associated locations at which the data are to be stored or retrieved. These and other features will be discussed in detail below.

Figure 2:
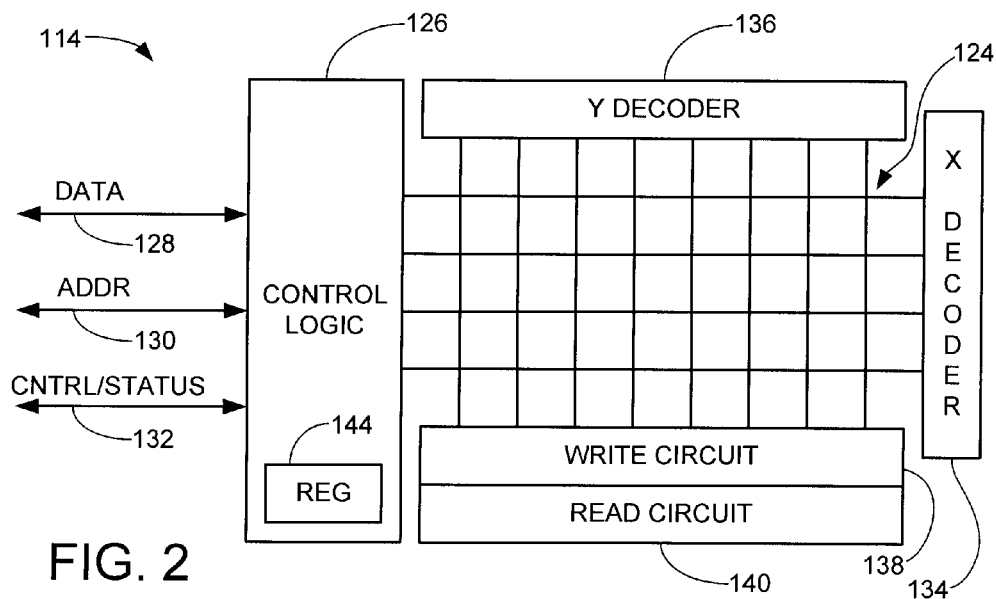
FIG. 2 shows circuitry used to read data from and write data to a memory array of the device of FIG. 1.

FIG. 2 provides a generalized representation of selected aspects of the memory space 114 of FIG. 1. Data are stored in each array 116 as an arrangement of rows and columns of memory cells 124, accessible by various row (word) and column (bit) lines, etc. The actual configurations of the cells and the access lines thereto will depend on the requirements of a given application.

Control logic 126 receives and transfers data, addressing information and control/status values along multi-line bus paths 128, 130 and 132, respectively. X and Y decoding circuitry 134, 136 provide appropriate switching and other functions to access the appropriate cells 124. As desired, adjacent arrays can be configured to share a single Y (row) decoder 136 to reduce RC delay effects along an associated word line.

A write circuit 138 represents circuitry elements that operate to carry out write operations to write data to the cells 124, and a read circuit 140 correspondingly operates to obtain readback data from the cells 124. Local buffering of transferred data and other values can be provided via one or more local registers 144. At this point it will be appreciated that the circuitry of FIG. 2 is merely exemplary in nature, and any number of alternative configurations can readily be employed as desired depending on the requirements of a given application.

In some embodiments, the memory cells 124 are characterized as so-called resistive sense memory (RSM) cells. As used herein, RSM cells are generally described as cells configured to have different electrical resistances which are used to store different logical states. The resistance of the cells can be subsequently detected during a read operation by applying a read current and sensing a signal in relation to a voltage drop across the cell. Exemplary types of RSM cells include resistive random access memory (RRAM), magnetic random access memory (MRAM), spin-torque transfer random access memory (STTRAM or STRAM), etc.

Advantages of RSM cells over other types of non-volatile memory cells such as EEPROM and flash include the fact that no floating gate is provided in the cell construction. No erase operation is necessary prior to the writing of new data to an existing set of cells. Rather, RSM cells can be individually accessed and written to any desired logical state (e.g., a "0" or "1") irrespective of the existing state of the RSM cell. Also, write and read power consumption requirements are substantially reduced, significantly faster write and read times can be achieved, and substantially no wear degradation is observed as compared to erasable cells, which have a limited write/erase cycle life.

Figures 3, 4:
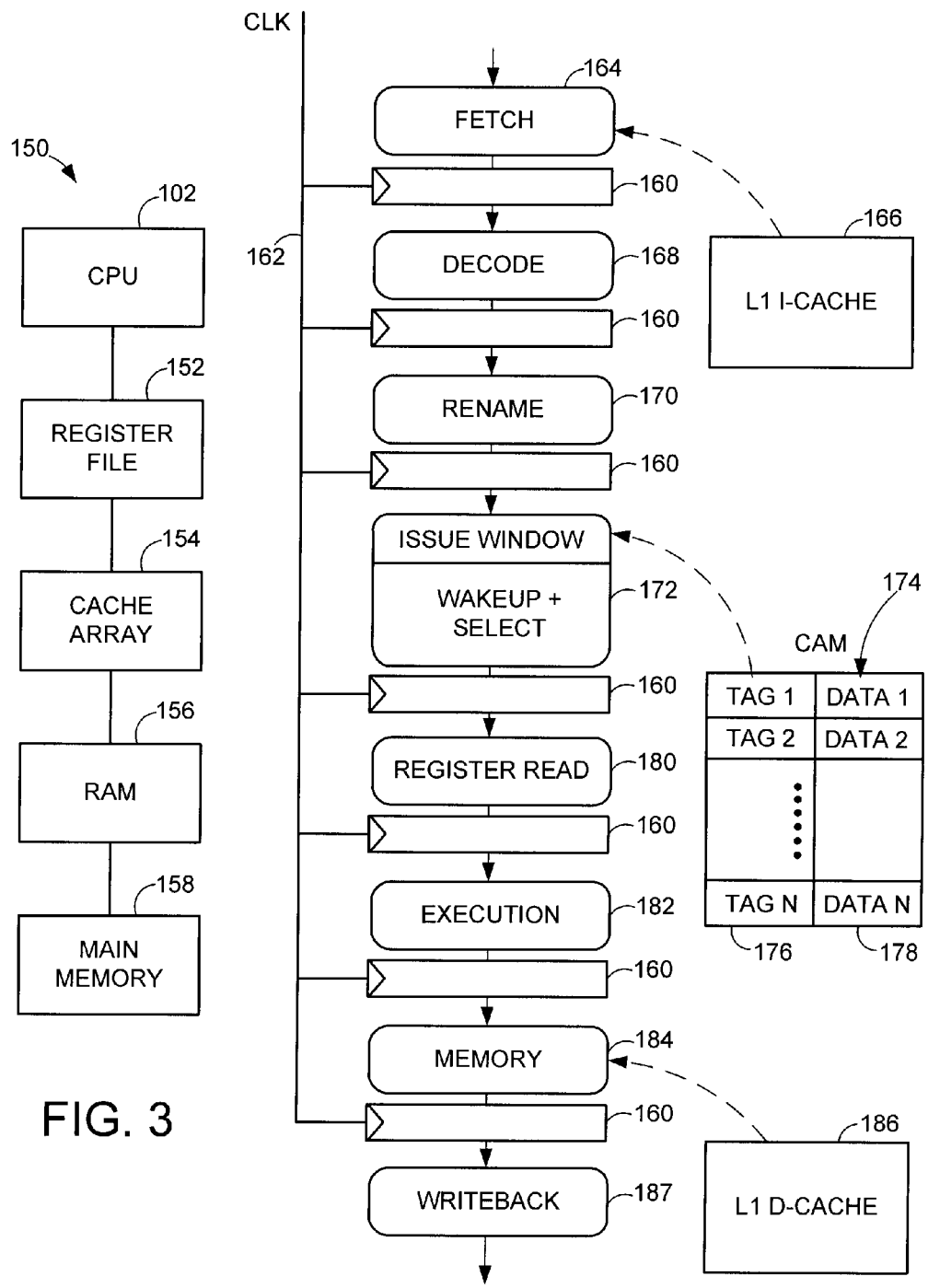
FIG. 3 shows a generalized representation of a memory hierarchy of the exemplary device of FIG. 1.
FIG. 4 shows a timing diagram for a pipeline memory structure of the device.

FIG. 3 generally illustrates an exemplary memory hierarchy in accordance with various embodiments of the present invention for a data storage device such as the device 100 of FIG. 1. Generally, various types of memories of different capacity and character are arranged to form a pipeline memory structure 150 for use by the CPU 102. As explained below, the memory hierarchy increases processing efficiencies of the CPU 102, provides substantially instant on/off capabilities, and reduces power consumption over conventional volatile or non-volatile designs.

With regard to FIG. 3, the pipeline 150 generally includes a register file 152, a cache array 154, direct access random access memory (RAM, such as volatile DRAM) 156, and non-volatile main memory 158. These respective elements can be variously mapped to the device 100 of FIG. 1; for example, the cache array can be incorporated on-chip with the controller 102 and/or located elsewhere, including but not limited to the buffer 112. The RAM 156 can correspond to the RAM 108, or can be provisioned elsewhere.

The non-volatile main memory 158 can correspond to the main memory space 114 of FIG. 1, although other configurations are readily envisioned. For example, in an alternative embodiment one or more rotatable magnetic media (discs, etc.) can be provided to serve as the main memory 158 in addition to, or in lieu of, a semiconductor memory space such as 114.

A plurality of hierarchical cache levels are used for the cache array 154, such as first, second and third cache levels (L1, L2 and L3, respectively). Some embodiments use dual L1 caches, one to store instructions (L1-I) and another to store data (L1-D). Other arrangements can readily be utilized, however.

During operation, data utilized by the CPU 102 are normally stored in local register files (152, FIG. 3) that are issued into the pipeline 150 for execution as needed. Generally, if the CPU 102 requests selected data during a data retrieval operation, if not available locally a methodical search process will be initiated whereby successive elements of the pipeline 150 will be checked to see of the selected data are resident therein.

For example, if L1 cache does not have the selected data, the L2 cache will be checked, and so on until the selected data is located and retrieved. Such retrieval may ultimately require an access operation upon the main memory 158. As used herein, a so-called cache hit involves retrieval of the data from a source along the pipeline 150 other than the main memory 158. Cache hits are generally desirable since retrieving the data from the main memory 158 can invoke a relatively long latency period, require bus negotiation and access, additional overhead processing by the CPU 102 to effect the transfer, etc.

FIG. 4 provides a sequencing diagram to generally illustrate the foregoing processing. In addition to the various elements depicted in FIG. 3, sequential devices 160 are interposed between adjacent pipeline stages, as shown in FIG. 4. The devices 160 operate to temporarily capture the outputs from a previous stage and are used to provide inputs to the next stage along the pipeline 150.

While a variety of constructions can be used for the sequential devices 160, such as flip-flops or latches, the use of these and other volatile devices will result in a loss of stored data when power is removed (such as in a sleep mode or if the device 100 is deactivated). Accordingly, in some embodiments the sequential devices 160 are formed to provide non-volatile storage of the stage-transferred data, such as through the use of RSM cells, so that the contents therein are retained in a power down condition.

The sequencing of FIG. 4 is generally illustrated as occurring in relation to clock pulses provided from a clock (CLK) via line 162. A fetch action is initially depicted at block 164. It is contemplated that this fetch action constitutes a data retrieval (read) instruction for selected data, and originates from L1-I cache 166. The fetch action instruction is decoded at block 168, renamed at block 170, and a wakeup and select operation takes place during an issue window at block 172. In some embodiments, a content addressable memory (CAM) structure 174 is utilized by the cache array with respective tag and data fields 176, 178 to provide an issue queue to handle such requests.

A register read block 180 next reads the instruction and the associated information from the CAM 174, and executes (block 182) a search for the requested data which is accessed at memory block 184 (in this case, from L1-D cache 186). A data writeback operation then takes place at block 187.

At this point it will be appreciated that the various aspects of the pipeline 150 can be constructed from volatile memory elements, such as SRAM or DRAM, etc., or from non-volatile memory elements such as flash, RRAM, etc. These respective design approaches provide both advantages and drawbacks. Generally, a volatile pipeline provides certain advantages including enhanced speed (i.e., can accommodate very high clock rates, etc.) and, depending on the technology, favorable power and heat generation levels.

However, a disadvantage of a volatile pipeline is that, upon a power down condition, all data in the pipeline are lost. Thus, to resume an operational state, the contents of the various storage locations along the pipeline generally require repopulation, such as from main memory. This can be a costly penalty with regard to latency delay to place the device in an operationally ready mode and resume operation at the point prior to the power down.

A wholly non-volatile pipeline construction, on the other hand, would advantageously provide substantially instant off-on response after a power down condition, since the various contents would be retained prior to the power down. At present, however, non-volatile technologies are generally slower and can have unfavorable power and/or heat generation characteristics.

Figure 5:
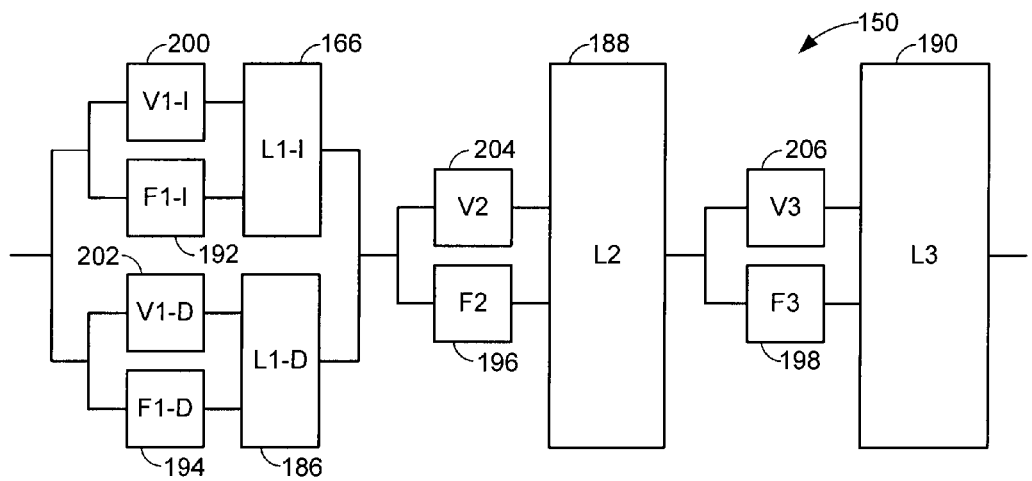
FIG. 5 provides a functional representation of the cache array of FIG. 3 in accordance with some embodiments.

Accordingly, various embodiments of the present invention configure the pipeline 150 so as to incorporate non-volatile filter cache and non-volatile victim cache memory blocks for each memory hierarch level, such as illustrated in FIG. 5. More specifically, FIG. 5 shows the aforementioned L1-I and L1-D caches 166 and 186 from FIG. 4, as well as an L2 cache 188 and an L3 cache 190. In some embodiments, the respective cache blocks comprise volatile memory blocks; for example, the L1 caches can be formed of SRAM and the L2/L3 caches can be formed of DRAM. In other embodiments, however, some or all of the cache can be non-volatile memory, such as RRAM, MRAM, STRAM, etc.

Each of the plurality of hierarchical cache levels in FIG. 5 (e.g., L1/L2/L3) has an associated non-volatile filter cache and a non-volatile victim cache. The filter caches are denoted as F1-I (192), F1-D (194), F2 (196) and F3 (198). The victim caches are denoted as V1-I (200), V1-D (202), V2 (204) and V3 (206). Generally, data retrieved from each cache level are respectively promoted to the associated non-volatile filter cache, and data replaced in each cache level are respectively demoted to the associated non-volatile victim cache. Filter and/or victim caches can further be provisioned for other components of the pipeline 150, such as the RAM 156 (FIG. 3).

Each filter cache in FIG. 5 constitutes a small cache inserted before each memory hierarchy level. Advantages of the filter caches are faster access latency due to small size and architecture (e.g., direct mapping), and significantly reduced access frequency for the associated cache level (as well as for the main memory 158, FIG. 3) due to cache hits upon the filter caches. In some embodiments, the filter caches are direct mapped caches, although other configurations can be alternatively used such as multi-way associative structures, so long as the total number of ways is relatively small.

Each victim cache in FIG. 5 also generally constitutes a small cache associated with each hierarchy level. In some embodiments, each victim cache is arranged so as to have a relatively small number of cache lines (e.g., 4, 8, etc.). The victim caches also can significantly reduce access frequency for the associated cache level and main memory.

Figure 6:
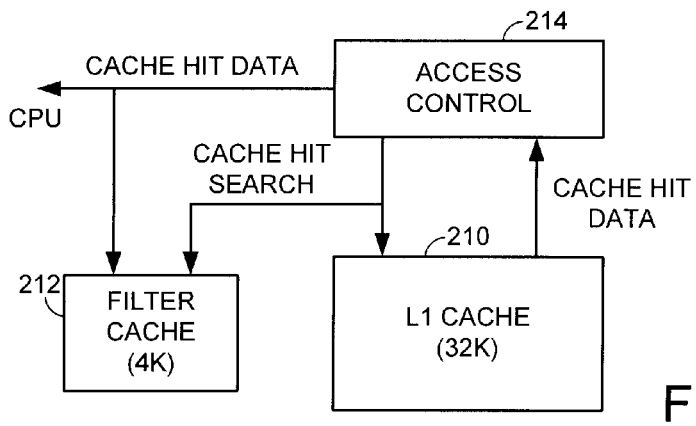
FIG. 6 illustrates operation of an exemplary filter cache.

The filter caches are generally used to store data that have just been retrieved from the associated cache level. For example, FIG. 6 shows an exemplary L1 cache 210 and an associated non-volatile filter cache 212. The L1 cache 210 is characterized as a four-way set associative cache with 32 KB of capacity. The filter cache 212 is a direct mapped 4 KB cache. Other respective sizes and ratios can be utilized as desired.

An access control block 214 searches the respective caches 210, 212 for a cache hit when selected data are requested.

While not shown in FIG. 6, it will be appreciated that in some embodiments the access control block 214 also searches the associated victim cache (not shown) for the selected data. The access control block can represent a portion of the controller 102, or circuit elements under the direction of said controller.

When a cache hit is obtained for the L1 cache 210 (i.e., the selected data are found to be resident in the L1 cache), the associated cache hit data are returned for use by the CPU, as shown. The access control block 214 further promotes (stores) the cache hit data from the L1 cache 210 to the filter cache 212. Such promotion can result in retention of the cache hit data in the L1 cache 210 as well (so two copies of the cached data are retained), or the cache hit data can be removed from the L1 cache 210 so that the data are transferred out of the L1 cache and into the filter cache.

The term "filter" in this context refers to the operation of the filter cache 212 in filtering requests for cache hits in the associated cache level 210. In some embodiments, requests for a given set of selected data by the access control block 214 are made first to the filter cache 212 before searching the L1 cache 210. Because of the high cache hit rate success for the filter cache 212, this will serve to filter out the requests from reaching the L1 cache 210. In other embodiments, concurrent searches are initiated by the access control block 214 in both caches 210, 212. Because of the higher access response rate of the filter cache 210, the filter cache should report whether the searched data are present or absent well before the L1 cache 210 search is completed.

Figure 7:
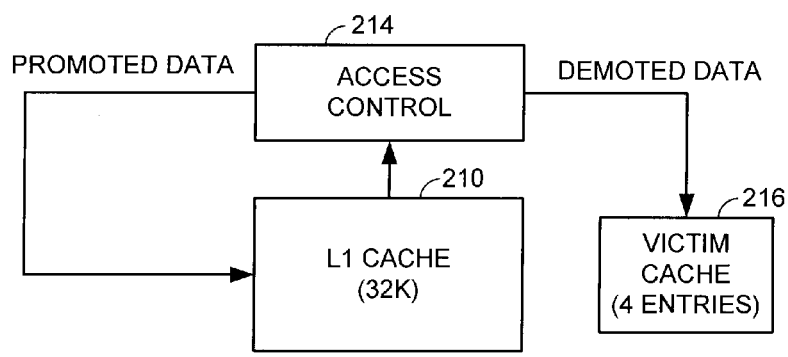
FIG. 7 illustrates operation of an exemplary victim cache.

The victim caches are generally used to store data that have just been "bumped" from the associated cache level. For example, FIG. 7 shows the L1 cache 210 and access control block 214 of FIG. 6 in conjunction with an associated victim cache 216. The victim cache 216 is characterized as relatively small, four-entry cache with a total of four cache lines. A write operation to place new data (promoted data) into the L1 cache 210 may result in the requirement to store the new data at a location currently storing other, older cached data. In such case, the access control block 214 initiates a second write operation to store the older (demoted) cached data from the L1 cache 210 to a selected cache line in the victim cache 216. It will be appreciated that the term "victim" refers to the fact that the older data are being demoted from the associated cache level to make room for (accommodate) the new replacement data.

At some point during operation, it is contemplated that the filter and victim caches 212, 216 will each become completely filled with existing entries. When an additional entry is therefore provided for placement in these caches 212, 216, a mechanism may be required to determine which existing entry will be supplanted. In some embodiments, a simple first-in-first out (FIFO) arrangement is provided for one or both of the caches 212, 216.

In another embodiment, an LRU (least recently used) chain designation is maintained so that entries are retained in cache in relation to frequency of cache hit (i.e., entries least used are demoted along the chain for eventual discard while entries most used promoted along the chain and are less likely to be discarded). In other embodiments, removal of an entry from either or both filter and victim caches 212, 216 results in writeback of the data to the main memory; this is particularly useful when the data constitute dirty data (i.e., writeback data supplied to the device 100 that has not yet been written to the main memory).

Data can further be moved from either or both of the filter and victim caches 212, 216 along the pipeline; for example, data moved out of an L1 filter cache can be written to a downstream cache, such as L2 cache, etc. These and other mechanisms can readily be used to retain respective priorities of the data in the pipeline 150 and increase both cache hit rates and instant-on capabilities.

From a temporal locality and special locality point of view, it is relatively likely that both filter cache data and victim cache data will be requested in the very near future (e.g., in the following clock cycles after movement of the data thereto). Advantages of the use of non-volatile filter cache and victim cache as disclosed herein include the fact that, when an instant-on operation is executed, data required to place the system back into its former state prior to the power down operation will likely be stored in the respective filter and/or victim caches. This saves the need to retrieve and load this data from a more distant and slower location, such as main memory. This can significantly improve the "virtual" access time of the cache memory, even if other aspects of the memory (e.g., L1/L2/L3) are volatile. It will be appreciated that the use of non-volatile sequential devices 160, as well as non-volatile structures for other aspects of the pipeline 150 (such as the CAM 174) can further this end.

A related advantage of the non-volatile filter and victim caches disclosed herein is the significantly reduced access times that can be achieved as a result of the smaller size and more efficient access capabilities of the cache. Although the caches are non-volatile and therefore may be slower than corresponding volatile devices of similar structure, the access response of the caches may be faster than the access response of the larger volatile cache levels. Thus, even during the course of normal operation, virtual increases in perceived pipeline response can be enhanced.

Yet another advantage is the reduction in both operational power and heat generation that can be achieved through the use of the non-volatile filter and victim caches. Volatile devices can require significant refreshing or other power consuming techniques. The use of multi-level non-volatile filter and victim caches can reduce power and heat generation, both from the devices themselves as well as by allowing the associated caches to consume less power and generate less heat due to fewer accesses to the cache levels.

Computer simulations were run to simulate operation of various devices using 70 nm technology features for an exemplary pipeline construction with two SRAM cache levels (L1 and L2) and two associated MRAM filter and virtual caches. These results are set forth in Table 1.

TABLE 1

|  | Normal Cache | | Filter Cache | | Victim Cache | |
| --- | --- | --- | --- | --- | --- | --- |
|  | 32k(L1) | 4M(L2) | 4K(L1) | 256k(L2) | 4-entry(L1) | 8-entry(L2) |
| Access Time (ns) | 0.577 | 2.023 | 0.321 | 0.626 | 0.235 | 0.237 |
| Access Energy (nJ) | 1.055 | 6.671 | 0.200 | 1.197 | 0.070 | 0.071 |

It can be seen from Table 1 that the respective filter and victim caches provide significantly improved access times and significantly reduced access energy as compared to the associated L1 and L2 caches.

Table II shows the results of further computer simulations to compare performance improvements for different memory hierarchies using a well known microprocessor simulator performance benchmark. A baseline system (SRAM L1/L2 as set forth above) with no filter or victim caches is shown in the first column to provide a baseline performance level. A second system that uses a single filter cache and a single victim cache for L1 cache is shown in the second column. A third system with two layers of filter and victim cache for layers L1 and L2 is shown in the third column.

TABLE 2

|  | No Filter or Victim Cache | 4K L1 Filter and 4-entry Victim Cache | L1 and L2 (4K-256K) Filter and (4-8 entry) Victim Cache |
| --- | --- | --- | --- |
| Normalized Performance | 1 | 0.97 | 0.95 |

It can be seen from Table 2 that the multi-level filter and victim caches provide about a 5% performance improvement over the baseline system.

Figure 8:
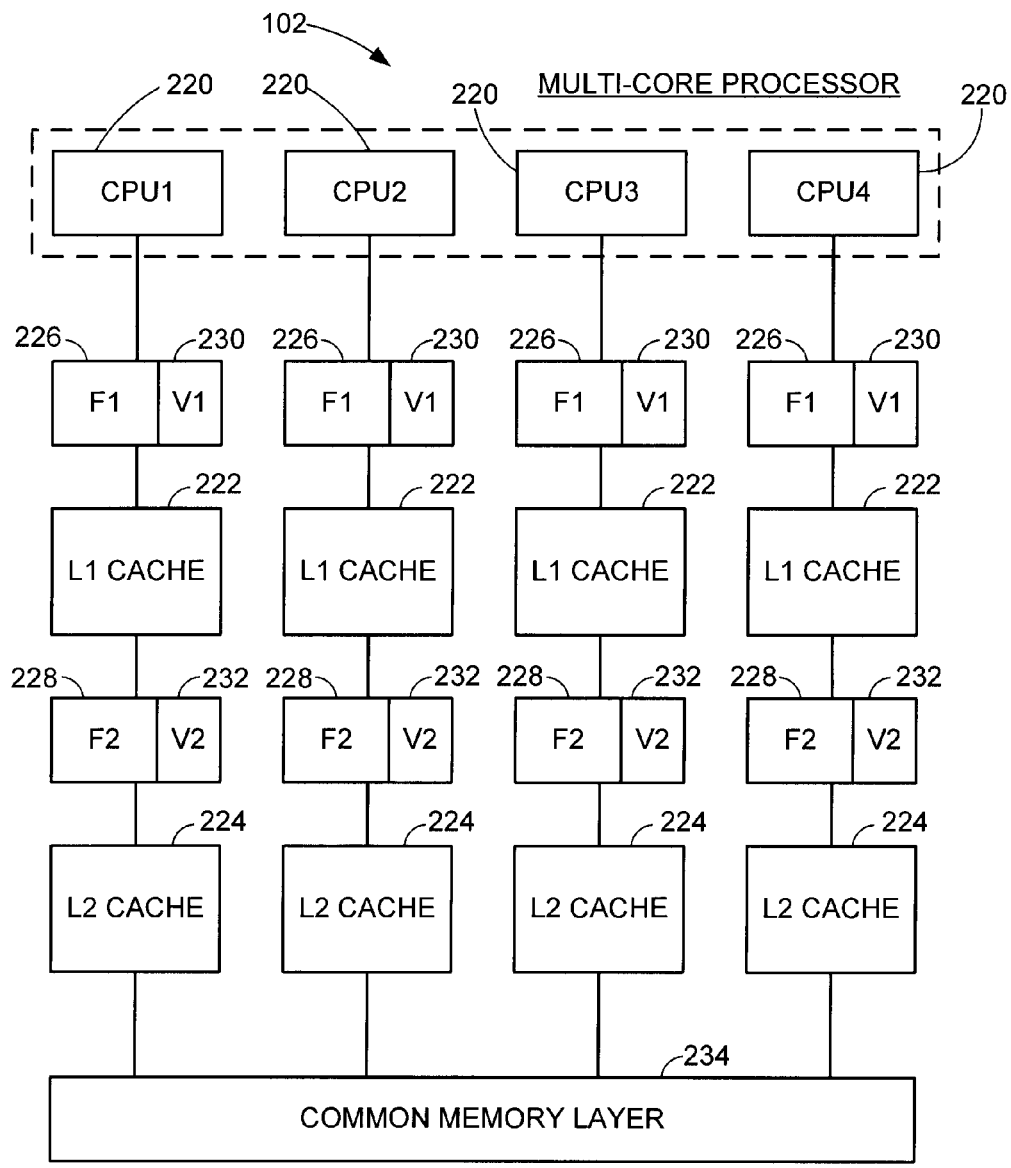
FIG. 8 illustrates an exemplary cache array structure for a multi-core controller in accordance with various embodiments.

While a single path pipeline memory structure has been presented, it will be appreciated that such is not necessarily limiting. FIG. 8 provides a corresponding memory hierarchy in the case where the controller 102 is characterized as a multi-core processor with n multiple concurrently operational CPUs 220 (in this case, n=4). A corresponding number of n first level (L1) caches 222 and n second level (L2) caches 224 are each respectively assigned to a different one of the n CPUs 220 to provide multiple parallel paths. L1 and L2 non-volatile filter caches 226, 228 and L1 and L2 non-volatile victim caches 230, 232 are respectively associated with the L1 and L2 caches 222, 224.

Each non-volatile filter cache generally operates as an isolator between a common memory layer 234 and the CPU cores 220. When the system decides to shut down a selected core, the core and its associated caching structure are powered down. However, because the filter and victim caches are non-volatile, the latest accessed data are still locally stored and available upon power up.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. An apparatus comprising a processor and a pipeline memory structure comprising a plurality of hierarchical cache levels including a first cache level and a second cache level, each of the first and second cache levels comprising a volatile cache, a non-volatile filter cache and a non-volatile victim cache, wherein data retrieved from the volatile cache of a selected level as a first cache hit during a data retrieval operation are removed from the volatile cache of the selected level and transferred to the associated non-volatile filter cache of the selected level before a second cache hit to the volatile cache of the selected level, and old data replaced in the volatile cache of the selected level are transferred to the associated non-volatile victim cache of the selected level.

2. The apparatus of claim 1, wherein during a data retrieval operation for selected data, an access control block accesses the filter cache of the selected level and the victim cache of the selected level prior to accessing said volatile cache of the selected level in an attempt to obtain a cache hit on the selected data.

3. The apparatus of claim 1, wherein during a data retrieval operation for selected data, an access control block concurrently initiates accesses of said volatile cache of the selected level and the associated filter and victim caches of the selected level in an attempt to obtain a cache hit on the selected data.

4. The apparatus of claim 1, wherein the volatile cache of the selected level has a first total data capacity, the filter cache of the selected level has a second total data capacity less than the first total data capacity, and the victim cache of the selected level has a third total data capacity less than each of the first and second total data capacities.

5. The apparatus of claim 1, wherein the first cache level is a first level (L1) processor cache and the second cache level is a second level (L2) processor cache, and the selected level is said L1 processor cache.

6. The apparatus of claim 1, in which the pipeline memory structure further comprises a non-volatile main memory space of the selected level, wherein data removed from the filter cache of the selected level and the victim cache of the selected level in each hierarchical level are written to the main memory space of the selected level.

7. The apparatus of claim 6, in which the non-volatile main memory space of the selected level comprises a non-volatile semiconductor array.

8. A method comprising:
providing a pipeline memory structure configured to store data for use by a controller, the pipeline comprising a hierarchical cache structure comprising at least a first cache level and a second cache level, each of the first cache level and the second cache level comprising a volatile cache, a non-volatile filter cache, and an associated non-volatile victim cache;
promoting retrieved data from the volatile cache in a selected cache level by transferring the retrieved data to the non-volatile filter cache associated with the selected cache level and removing said retrieved data from the volatile cache in the selected cache level responsive to a first cache hit upon said data and before a second cache hit to the volatile cache of the selected level; and
demoting old data replaced in the volatile cache in the selected cache level by transferring the old data to the non-volatile victim cache associated with the selected cache level.

9. The method of claim 8, wherein the promoting step comprises accessing the filter cache associated with the selected cache level in an attempt to obtain a cache hit for the retrieved data therein prior to accessing the volatile cache of the selected cache level.

10. The method of claim 8, wherein the demoting step comprises placing new data into the selected cache level at a location therein previously occupied by the demoted old data, and wherein the demoted old data are moved to the associated victim cache in the selected cache level to accommodate storage of said new data.

11. The method of claim 8, wherein the selected cache level comprises a first level (L1) cache for the controller.

12. The method of claim 8, wherein the providing step further comprises providing a plurality of non-volatile sequential devices interposed between adjacent ones of said plurality of hierarchical cache levels each temporarily storing data from a selected cache level prior to writing said data to an adjacent cache level.

13. An apparatus comprising:
a cache memory structure comprising first and second cache levels each comprising a volatile cache, a non-volatile filter cache and a non-volatile victim cache; and
an access control block which, responsive to a data retrieval command to retrieve selected data, searches the non-volatile filter cache of the first cache level for the selected data and, responsive to the selected data not being stored therein subsequently searches the volatile cache of the first cache level for the selected data and, responsive to a first cache hit to the volatile cache, transfers the selected data to a host and concurrently removes the selected data from the volatile cache and places the selected data in to the non-volatile filter cache of the first cache level before a second cache hit to the volatile cache.

14. The apparatus of claim 13, in which the access control block further operates to replace first data stored in the volatile cache with second data responsive to a second data retrieval command and to concurrently demote the first data so that a copy of the first data is moved to the non-volatile victim cache.

15. The apparatus of claim 13, in which at a conclusion of the promotion of the selected data to the non-volatile filter cache, the selected data are stored in the non-volatile filter cache of the first cache level and are not stored in the volatile cache of the first cache level.

16. The apparatus of claim 13, in which removal of the selected data from the volatile cache results in writeback of the selected data to a main memory.

17. The apparatus of claim 13, characterized as a data storage device that further comprises a controller and a main memory coupled to the cache structure.

18. The apparatus of claim 17, in which the main memory comprises a rotatable data storage disc.

19. The apparatus of claim 17, in which the main memory comprises a solid-state memory array.

* * * * *

UNITED STATES PATENT AND TRADEMARK OFFICE
CERTIFICATE OF CORRECTION

| | | |
|---|---|---|
| PATENT NO. | : 8,966,181 B2 | Page 1 of 1 |
| APPLICATION NO. | : 12/332669 | |
| DATED | : February 24, 2015 | |
| INVENTOR(S) | : Yiran Chen et al. | |

It is certified that error appears in the above-identified patent and that said Letters Patent is hereby corrected as shown below:

In the Claims

In Col. 10, line 31,
delete "to"

Signed and Sealed this
Twenty-ninth Day of March, 2016

Michelle K. Lee
*Director of the United States Patent and Trademark Office*